United States Patent [19]
Kawate et al.

[11] Patent Number: 5,471,034
[45] Date of Patent: Nov. 28, 1995

[54] HEATER APPARATUS AND PROCESS FOR HEATING A FLUID STREAM WITH PTC HEATING ELEMENTS ELECTRICALLY CONNECTED IN SERIES

[75] Inventors: Keith W. Kawate; Peter G. Berg, both of Attleboro Falls, Mass.

[73] Assignee: Texas Instruments Incorporated, Dallas, Tex.

[21] Appl. No.: 32,940

[22] Filed: Mar. 17, 1993

[51] Int. Cl.⁶ ........................................ H05B 1/02
[52] U.S. Cl. ........................ 219/485; 219/483; 219/504; 219/505; 219/530; 219/540
[58] Field of Search ................................ 219/202, 505, 219/530, 540, 485, 483, 505, 504

[56] References Cited

U.S. PATENT DOCUMENTS

| 4,346,285 | 8/1982 | Nakamura et al. | 219/505 X |
| 4,939,349 | 7/1990 | Liu. | |
| 5,057,672 | 10/1991 | Bohlender et al. | 219/540 |
| 5,239,163 | 8/1993 | Brouwers | 219/540 X |
| 5,256,857 | 10/1993 | Curhan et al. | 219/202 |

FOREIGN PATENT DOCUMENTS

| 0350528 | 1/1990 | European Pat. Off. . | |
| 0368206 | 5/1990 | European Pat. Off. . | |
| 0464955 | 1/1992 | European Pat. Off. . | |
| 464955 | 1/1992 | European Pat. Off. | 219/202 |
| 0575649 | 12/1993 | European Pat. Off. . | |

OTHER PUBLICATIONS

Patent Abstracts of Japan, vol. 14, No. 221 (M–971) 10 May 1990 & JP-A-02 053 628 (Texas Instr. Japan Ltd.) 22 Feb. 1990 *Abstract*.

Primary Examiner—Mark H. Paschall
Attorney, Agent, or Firm—Russell E. Baumann; Richard L. Donaldson; René E. Grossman

[57] ABSTRACT

A heater for heating fluid is shown having a plurality of self-regulating electrical resistance heater elements 22 placed in electrically and thermally conductive relationship with heat transfer members 20, 120. The heat transfer members are each configured to form a plurality of fluid receiving channels so that when placed in a fluid stream heat generated by the heater elements will be dissipated to the fluid through the heat transfer members. Additionally, thermally conductive grease is used between the heater elements 22 and heat transfer member 20, 120 to better transfer the heat. The heater elements are arranged in groups with at least two heater elements in a group electrically connected in series and the groups electrically connected in parallel.

13 Claims, 6 Drawing Sheets

HEATER APPARATUS AND PROCESS FOR HEATING A FLUID STREAM WITH PTC HEATING ELEMENTS ELECTRICALLY CONNECTED IN SERIES

BACKGROUND OF THE INVENTION

This invention relates generally to heaters and more specifically electric heaters employing heat transfer members used to heat fluids such as air. By way of example, compartment heaters for vehicles have used heat exchange fin members mounted in air passages with self-regulating electrical resistance heater elements of positive temperature coefficient of resistivity (PTC) mounted in heat transfer relation with the heat exchange fin members. Upon energization the self-regulating heater elements quickly increase in temperature to a so called anomaly temperature and they in turn heat up the fin members. Air directed through the passage is then heated by the heat exchange fin members. PTC heating is advantageous for several reasons. For example, such heaters are characterized by having fast warm up due to the heater material's low initial resistance yet the heaters do not overshoot, that is, the temperature of the heater is limited essentially at its anomaly temperature. PTC heating provides high output at low temperature and high airflow while maintaining a relatively constant operating temperature. Such heaters are of rugged construction compatible with high vibration and high temperature automotive environments, create no electrical or mechanical noise and have wide voltage range capability. An example of a heater of this type is shown and described in U.S. Pat. 5,256,857 issued Oct. 26, 1993, assigned to the assignee of the present invention.

Although there are no minimum flow requirements for PTC heaters as there would be for a conventional straight resistance heater which would overheat and burn-up under still air conditions, if the heater is proximate to materials which are sensitive to high temperatures, for example, low temperature plastic in the duct near the heater, then generally some type of control device is employed to de-energize the heater when air flow is below some minimum rate.

It is an object of the present invention to provide a novel and improved heater for heating a fluid stream, to provide a heater particularly adapted for use for heating an air stream for an automotive passenger compartment or the like, to provide such a heater which is inexpensive to manufacture and assemble, to provide such a heater which is reliable, safe and efficient to use and to provide a heater which is more adaptable for use with temperature sensitive materials located proximate to the heater than prior art PTC heaters. Yet another object is the provision of a fluid stream heater which is particularly useful with high voltage electrically powered vehicles.

SUMMARY OF THE INVENTION

Briefly, in accordance with the invention, a heater apparatus comprises one or more modules adapted to be mounted in a fluid passage, each module mounting a plurality of electrical heater elements each having a positive temperature coefficient of resistivity (PTC) mounted in heat conductive relationship with heat transfer means in the form of fin members. The plurality of PTC heater elements include at least two heater elements electrically connected in series so that when fluid flow rates through the passage are above a selected rate the voltage drop across each of the series connected heater elements is generally equal with the resistance of each element being relatively low and as fluid flow through the passage decreases below the selected rate the resistance of one of the series connected heater elements increases until most of the voltage potential of the electrical source is dropped across the heater element having the increased resistance thereby effectively shutting off the remaining series connected heater elements and reducing the heat output of the heater apparatus.

According to a preferred embodiment of the invention, a heater apparatus comprises a module having a plurality of groups of PTC heater elements stacked one on top of another with each group comprising a first pair of PTC heater elements sandwiched between first and second electrically conductive heat transfer members placed on top of a second pair of PTC heater elements also sandwiched between third and fourth electrically conductive heat transfer members. A first or ground terminal is placed in electrical connection with a top face of the first pair of PTC heater elements in the first or top group and a second or positive potential terminal is placed in electrical connection, through a heat transfer member, with a bottom face of the second pair of PTC elements of that group and, through a heat transfer member, with a top face of the first pair of PTC heater elements in the next contiguous group. Another ground terminal is placed in electrical connection, through a heat transfer member, with a bottom face of the second pair of PTC heater elements in that group, and in like manner electrical connections are made to the remaining groups. Preferably an electrically insulative layer is placed around each pair of PTC heater elements to prevent any possibility of short circuiting around the PTC heater elements and, if desired, thermal grease can be placed on opposite faces of the PTC heater elements to enhance heat transfer therefrom. The module includes five groups held between opposed side frame members of electrically insulative material and subjected to a selected level of compressive force by suitable spring members to provide good electrical connection among the electrically conductive components of the module as well as a good thermal connection. It will be understood that the particular number of groups employed is a matter of choice dependent upon space allocation and other requirements of particular applications. An electrically conductive rail is then mounted on each frame member and the rails are connected respectively to ground and positive potential so that the groups are connected in parallel with each first pair of heater elements in a group connected in series with each second pair in the respective group.

According to a feature of the invention, a fluid stream is heated by the process of thermally coupling a plurality of self-regulating PTC electrical resistance elements with heat transfer members configured to form a plurality of fluid receiving passages electrically connecting the PTC elements in groups with PTC elements within a group serially connected and the groups connected in parallel so that when fluid flow decreases below a selected rate heat output of the PTC elements will be reduced.

According to an embodiment of the invention, a heater apparatus comprises at least one group of first and second PTC heater elements thermally coupled to heat transfer members and electrically connected in series. According to another embodiment, a heater apparatus comprises at least one group of first, second and third PTC heater elements thermally coupled to heat transfer members and electrically connected in series.

According to a feature of the invention, the heat transfer members comprise low cost material such as aluminum or the like to provide high thermal and electrical conductivity to achieve high operating efficiency of the heater apparatus. The heat transfer members are formed of strips of the material bent back and forth in zig-zag fashion to provide a plurality of open channels extending between upper and lower semi-continuous surfaces which make electrical and thermal engagement with a contiguous heat transfer member, terminal or PTC heater element. The electrical resistance heater elements, typically flat thin discs of square, round, triangular or rectangular outline or the like, are also adapted for low cost volume production. The heater components are easily assembled with assurance they will be reliably retained in their housing in thermally and electrically conductive engagement with each other. Assembly of the apparatus requires fewer operational steps and less time than conventional parallel connected PTC heater elements since fewer welding connections need be made to the side rail members.

As disclosed in application Ser. No. 07/571,379 referenced supra, it is conventional when using multi-pill PTC heaters to arrange PTC heater elements in parallel. This arrangement ensures that every pill will be activated individually and therefore operate and self-regulate independently of other heater elements since each element is subjected to the supply voltage.

PTC resistors connected in series exhibit different operating characteristics. When voltage is applied the resistance of one of the resistors will rise significantly causing almost all of the potential to be dropped across it leaving little voltage available for the other resistors. The resistor having the large increase in resistance is said to be locked and the phenomenon is referred to as banding. Due to this phenomenon, PTC resistors have not been used in series arrangement. However, when PTC heater elements made in accordance with the invention are mounted in heat transfer relationship with heat transfer members and when placed in a fluid stream, if fluid flow increases to a high rate and/or ambient temperature decreases, at least in a series arrangement of two or three PTC heater elements, the locked PTC heater element will be cooled and its resistance will drop causing the voltage drop across the element to decrease accordingly. As the voltage drops across the element which is unlocking the voltage across the other two elements increase. At some fluid flow the voltage drop across the other element(s) will be distributed relatively evenly with the resistor operating on the flat portion of the resistance-temperature curve and this represents the maximum power fluid flow condition.

Power and relative temperature vs different airflow rates for a conventional parallel connected PTC heater element is shown in FIG. 6 while FIG. 7 shows a similar graph of a group of series-parallel PTC heater elements made in accordance with the invention in which each group comprised three series connected heater elements. It will be seen that FIGS. 6 and 7 correspond to each other at higher flow rates whereas at lower flow rates the relative temperature of series-parallel arrangement is significantly lower. FIG. 8 shows the voltage drop across each of three series-connected elements at low, medium and high airflows.

BRIEF DESCRIPTION OF THE DRAWING

Other objects, advantages and details of the novel and improved heater apparatus and heating process of the invention appear in the following detailed description of preferred embodiments of the invention, the detailed description referring to the drawings in which.

DETAILED DESCRIPTION OF INVENTION

Figure 1:
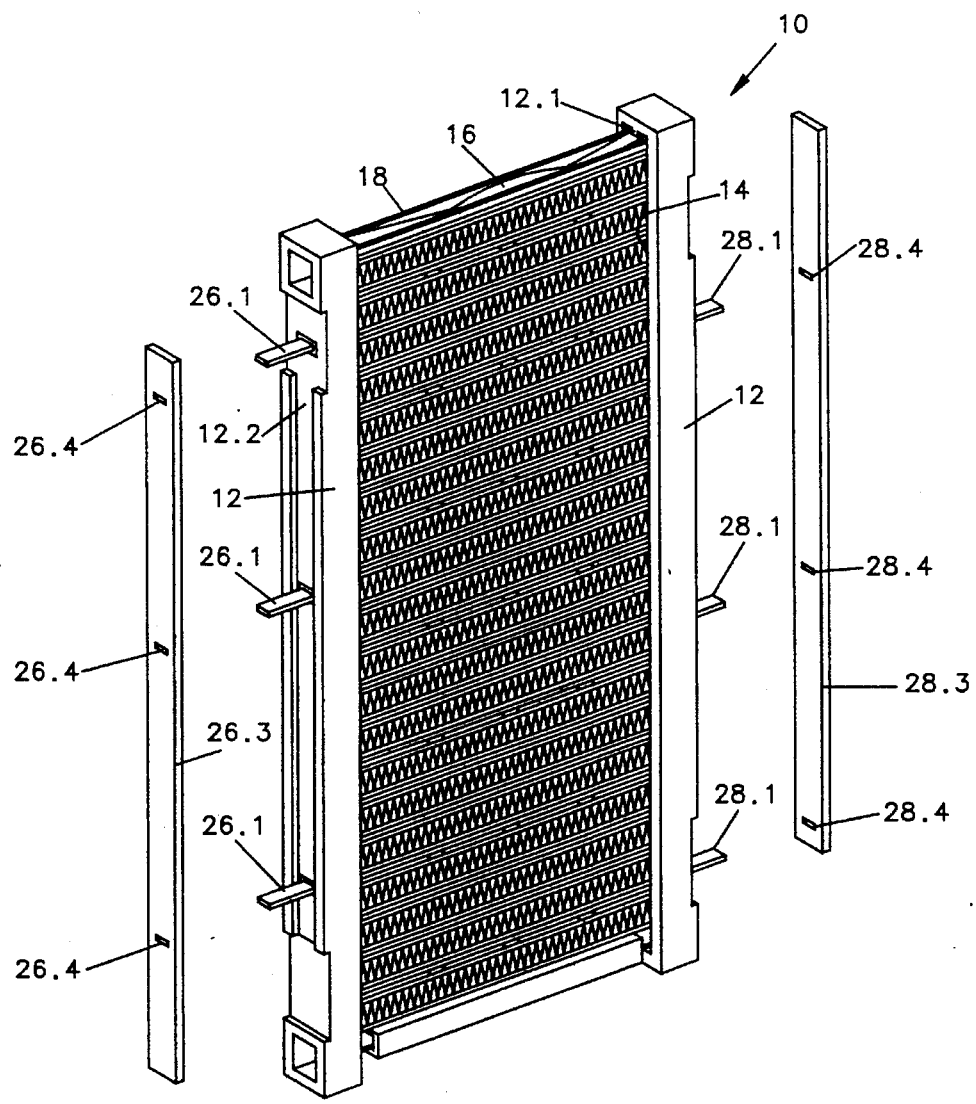
FIG. 1 is a perspective view of a heater module made in accordance with the invention.
Figure 2:
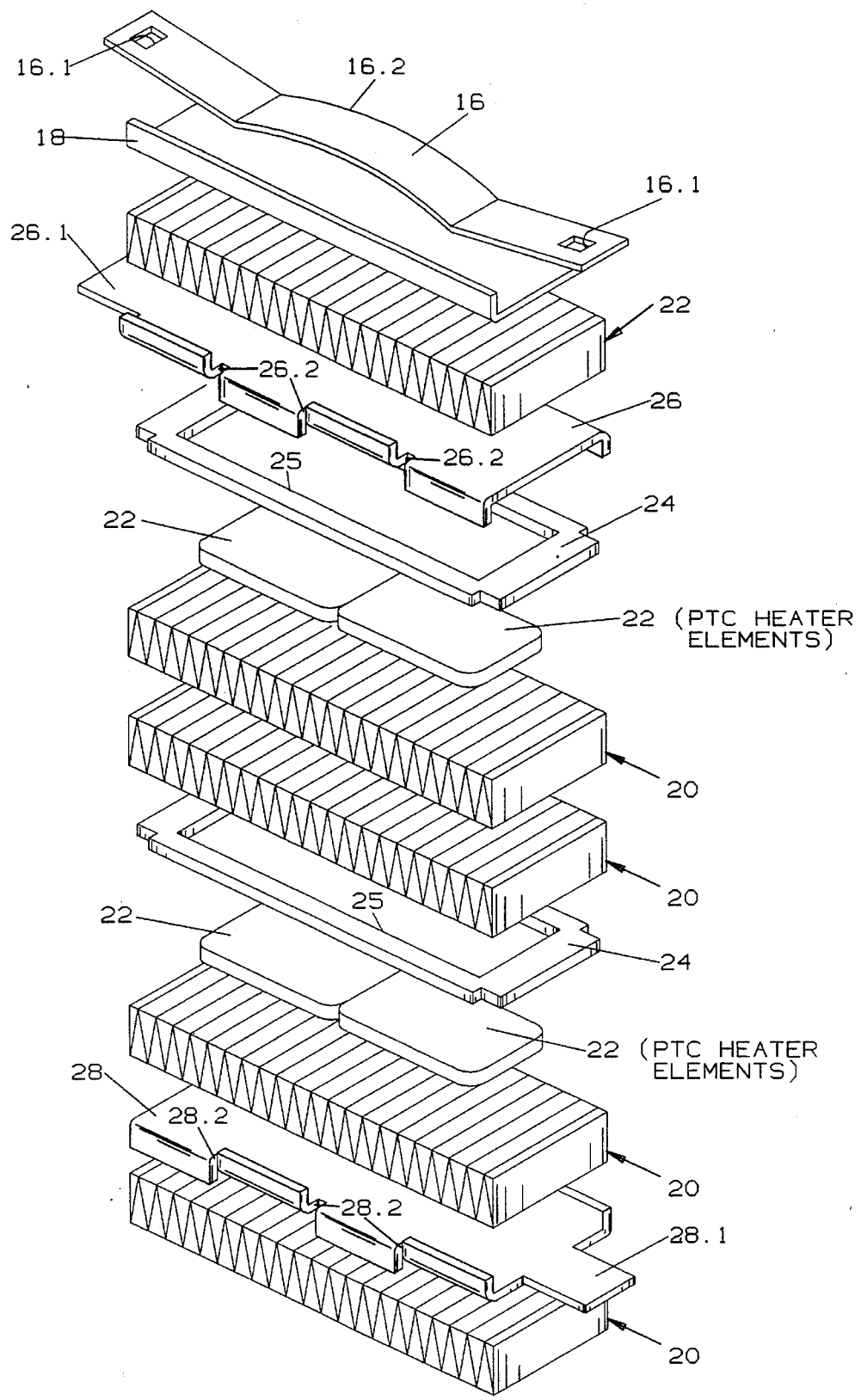
FIG. 2 is a blown apart perspective of a portion of the FIG. 1 module.
Figure 3:
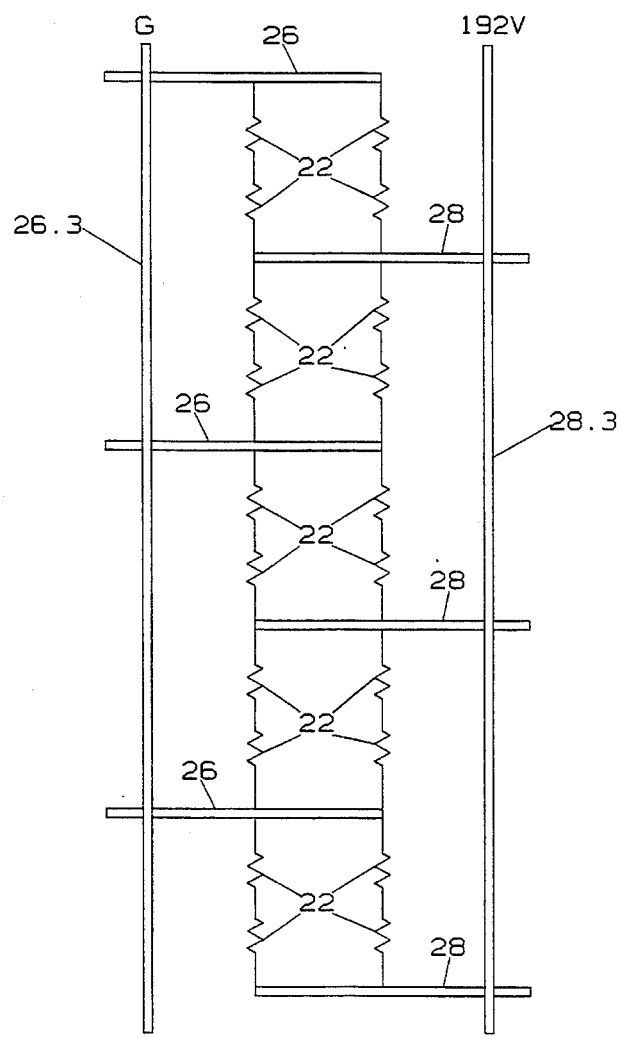
FIG. 3 is an elevational schematic diagram of the FIG. 1 module.

Turning now to FIGS. 1–3, heater apparatus made in accordance with a preferred embodiment of the invention is shown comprising a module 10 having opposed elongated side frame members 12 formed of suitable electrically insulative material such as polycarbonate. Frame members 12 have recessed portions 14 which are adapted to receive respective distal end portions of a heater assembly to be described below. Module 10 includes five groups of PTC heater elements and heat transfer members stacked one over the other between opposed spring members 16 adapted to place a selected amount of compressive force among the electrically conductive components of the module to provide a good electrical and thermal connection therebetween. With reference to FIG. 2 which shows a portion of the module blown apart for purposes of illustration, spring member 16 is received in a channel configured member 18 which is used to evenly distribute the force provided by spring 16 to the components of the assembly disposed in the stack. Spring 16 is provided with apertures 16.1 adjacent opposite distal ends which are adapted to receive suitable projections 12.1 (FIG. 1) formed on frame members 12 within recessed portions 14. Heat transfer members 20 are placed above and below PTC heater elements 22 with electrically insulative gaskets 24 formed of suitable material such as silicone pressure sensitive material having a thickness less than that of elements 22. Gaskets 24 are formed with a window 25 to position and maintain a pair of PTC heater elements 22 in a selected location and prevent short circuiting between heat transfer members disposed on opposite sides of a pair of PTC heater elements. A first terminal plate 26 is placed in electrical engagement with the upper face of the upper pair of PTC heater elements 22, seen in FIG. 2, and has a terminal connector portion 26.1 extending laterally to the left as seen in FIGS. 1 and 2. A second terminal plate 28 is placed in electrical engagement with the lower face of the lower pair of PTC heater elements 22, seen in FIG. 2, and has a terminal connector portion 28.1 extending laterally to the right as seen if FIGS. 1 and 2. These two pair of PTC heater elements and their respective heat transfer members form one of the five groups included in module 10. The lower most heat transfer member 20 shown in FIG. 2 is a component of the next group of PTC heater elements and heat transfer members. Terminal plates 26 and 28 are formed with laterally spaced notches 26.2, 28.2 respectively along their front and back edges (the notches shown in the drawing on the front edges) so that the outer edge portion, if desired, can be bent alternately slightly up and down to stabilize the position of heat transfer members in engagement with the terminal plates and add rigidity to the assembly.

Terminal connectors 26.1 are received through aligned apertures in one frame member 12 and the other terminal connectors 28.1 are received through aligned apertures in the other frame member 12. A rail 26.3 is received in a groove 12.2 formed in the left frame member 12 as seen in FIG. 1 with terminal connectors 26.1 received through respective apertures 26.4. Similarly, rail 28.3 (partly broken away in FIG. 2) is received on the right frame member 12 as seen in the figure with terminal connectors 28.1 received through respective apertures 28.4. The terminal connectors are then bent over and attached to their respective rails as by welding (not shown). As described, module 12 has five groups of four PTC heating elements 22 with the groups connected in parallel relation with one another and with one pair of heater elements 22 connected in series with the other pair of a group, as shown in FIG. 3.

As stated above, the particular number of groups employed is a matter of choice with a single group being appropriate for certain applications and fewer of more than five groups for certain other applications. The number of PTC heater elements connected serially within a group is normally limited to two or three, as desired. That is, due to problems associated with unlocking banded PTC heater elements most applications are limited to three serially connected PTC heater elements.

Figure 1A:
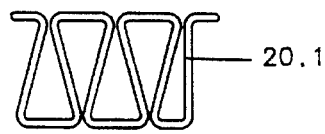
FIG. 1a is a broken away front elevational view of a portion of a heat transfer member used in the FIG. 1 module.

Spring elements 16 are formed of stiffly resilient materials such as stainless steel and preferably have wave spring portions 16.2 as shown in FIG. 2. Terminal plates 26, 28 are formed of suitable electrically and thermally conductive material such as aluminum or steel. Heat transfer members 20 are each formed from a continuous strip 20.1 of good thermally and electrically conductive material, such as aluminum, bent back and forth on itself in zig-zag or accordion like fashion into loops with generally flat portions at each extremity of a loop. The loops are pushed closely together so that member 20 effectively forms an elongated strip, from one side to another, of open channels or louvers with the strip having a generally flat, semi-continuous upper and lower surface, as seen in FIG. 1a. It will be understood that other forms of heat transfer members could be used, if desired, such as composite members or the like as long as they have good heat transfer characteristics. As used in the FIG. 1–3 embodiment the heat transfer members are electrically conductive and serve as electrical conductors in a circuit with the PTC heater elements with electrical connection being effected by physical engagement under the compressive force provided by spring members 16. However, if desired, electrical connection to the heater elements could be effected providing terminal plates engaging each upper and lower face of the PTC heating elements for example, in applications where it is desired to electrically isolate the heat transfer members from the circuit, wherein a suitable electrically insulative layer could be placed between the terminal members and contiguous heat transfer members. However, utilizing the heat transfer members 20 as electrical conductors provides an assembly with fewer components and one which is easier to assemble.

Preferably each heater element 22 comprises a body of ceramic material of lanthanum-doped barium titanate or the like of positive temperature coefficient of resistivity (PTC) having electrical contact means preferably formed with a rough metal surface on two opposite faces of the ceramic body by flame-spraying with aluminum or the like. As such self-regulating electrical resistance heater elements are well known, they are not further described herein and it will be understood that when the heater elements are electrically energized by directing electrical current through the body between the contacts, the body material is self-heated to provide a heat output and to progressively increase in temperature and resistance until the heater element stabilize at a temperature at which the reduced heat generated by the increased resistance is balanced by heat being dissipated or withdrawn from the elements through the heat transfer members.

As mentioned above, a thermal grease such as a zinc oxide powder filled silicon grease or the like can be disposed between the heater elements and adjacent terminals or heat transfer members to enhance heat transfer from the heater elements.

Heating apparatus made in accordance with the invention is useful in many applications, such as supplemental air heaters for compartments of automobiles powered by internal combustion or diesel engines in which the main heater is provided by heat generated by the combustion of fuel. Another application in which use of the present invention is particularly advantageous is in electrically powered automobiles in which the total compartment heat is provided by electrical resistance heating. Such heaters are typically energized by high voltage, in one application, for example, in the order of 192 volts, in another 336 volts. The present invention, utilizing series connected heater elements, reduces power at low fan speeds by reason of inherent PTC properties. In addition, in the unlikely event of a PTC heater element malfunction, the other pill(s) connected in series to it will act as automatically resetting fuses or current limiters thereby providing an additional safety function.

Figure 4:
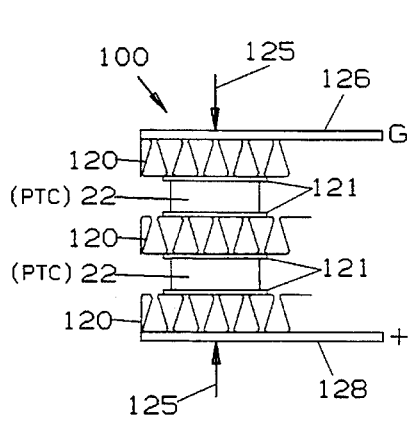
FIG. 4 is a schematic representation of another embodiment of the invention.

With reference to FIG. 4, a schematic diagram shows a modified embodiment of the invention in which a heater apparatus 100 comprises a single group of PTC heater elements 22 and electrically conductive heat transfer members 120. A first, upper, heat element 22 as seen in the figure and a second, lower, heater element 22 are respectively disposed between heat transfer members 120. Thermally conductive grease 121, is shown placed between the heater elements and contiguous heat transfer members to enhance heat transfer. Terminal 126 is in electrical connection with the upper heat transfer member 120, and 128 is in electrical connection with the lower heat transfer member 120, connecting the two heater elements in series relation. Although a single heat transfer member 120 is shown disposed between the two heater elements, it will be understood that an additional heat transfer member 120 can be placed between the two heater elements to obtain more evenly distributed heat flow, if desired.

Figure 5:
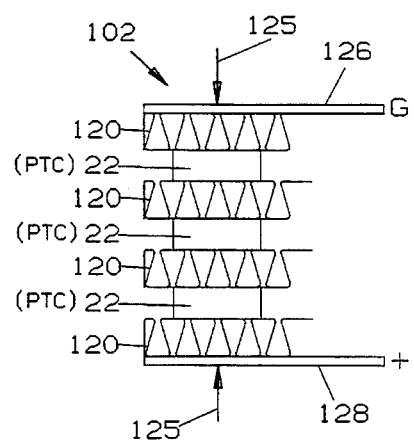
FIG. 5 is a schematic representation of yet another embodiment of the invention.
Figure 6:
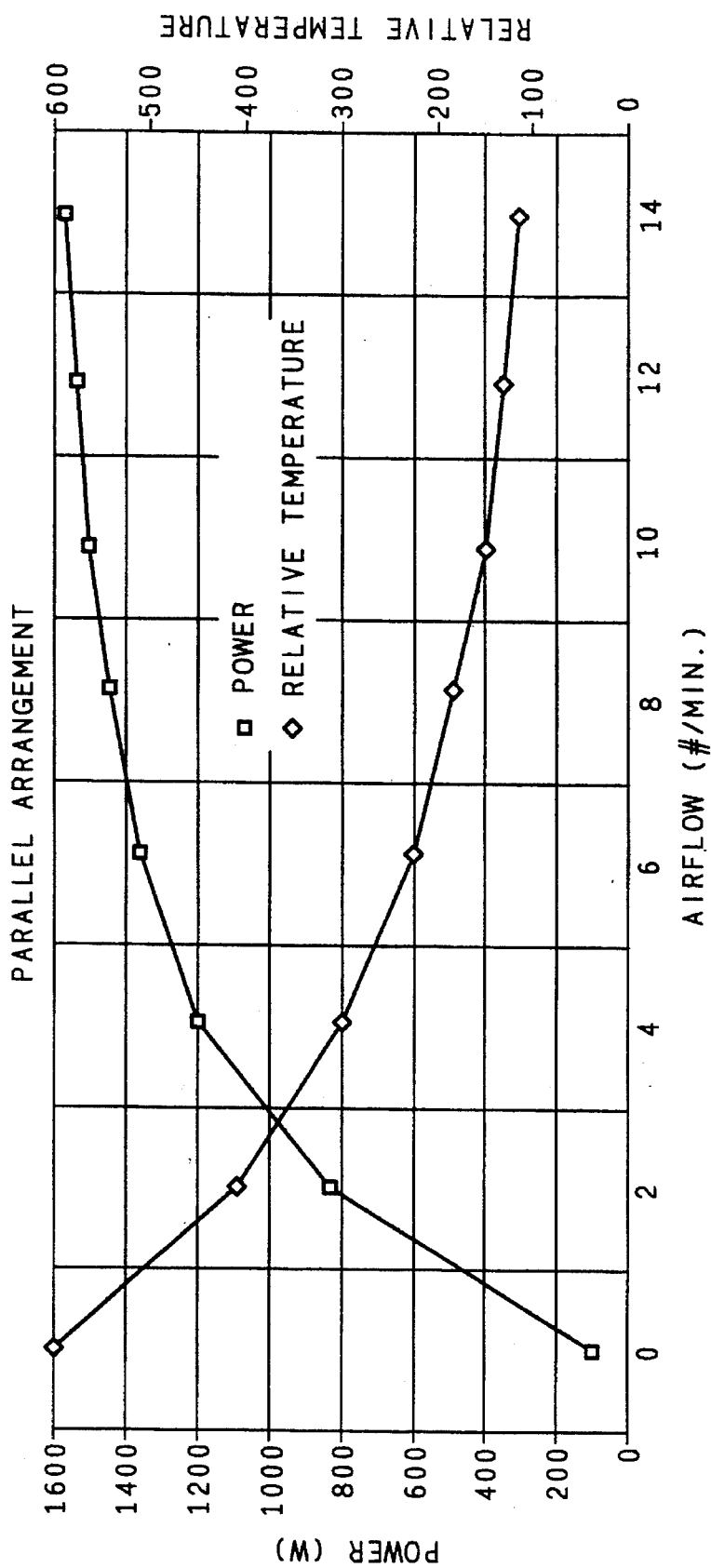
FIGS. 6 and 7 are power and relative temperature vs airflow graphs for parallel connected PTC heater elements and series-parallel connected PTC heater elements respectively.
Figure 7:
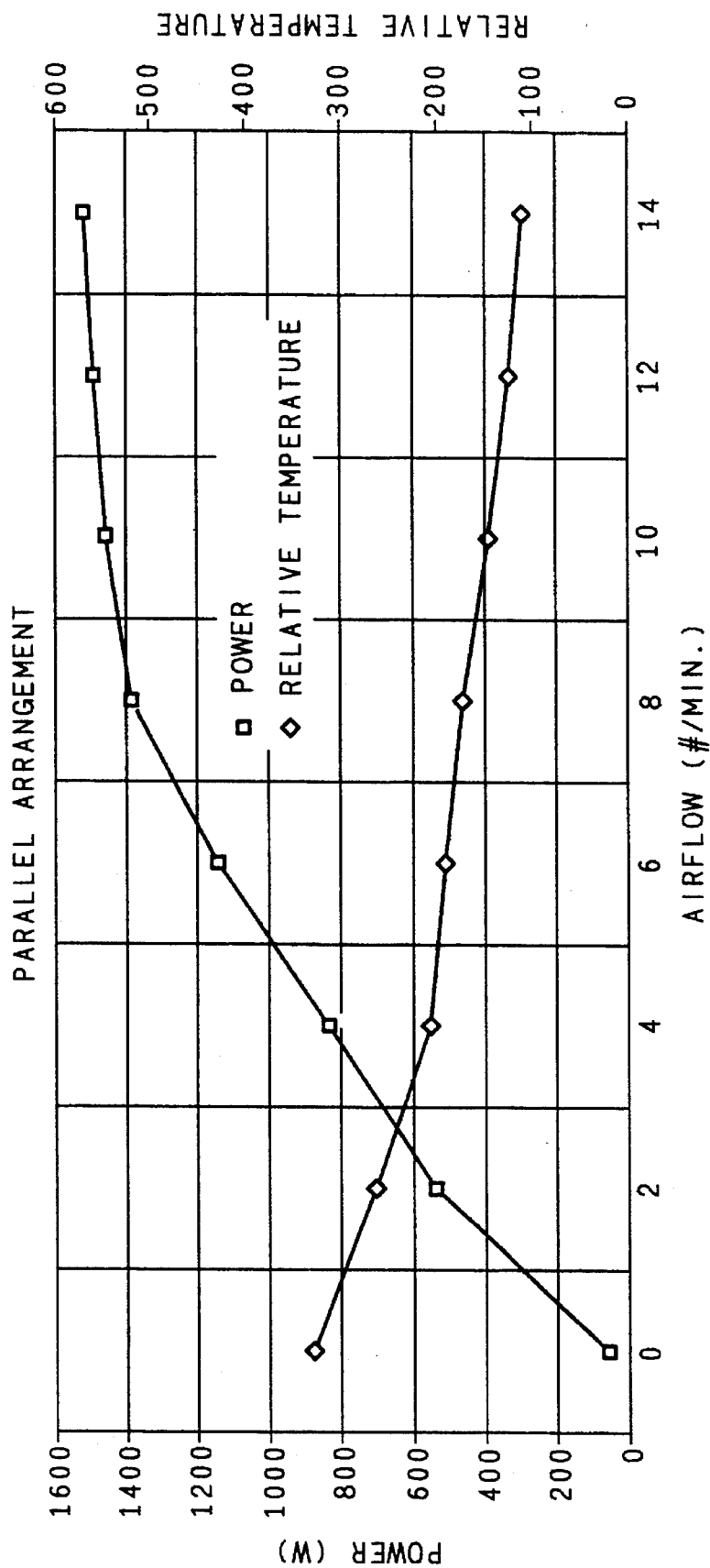
Figure 8:
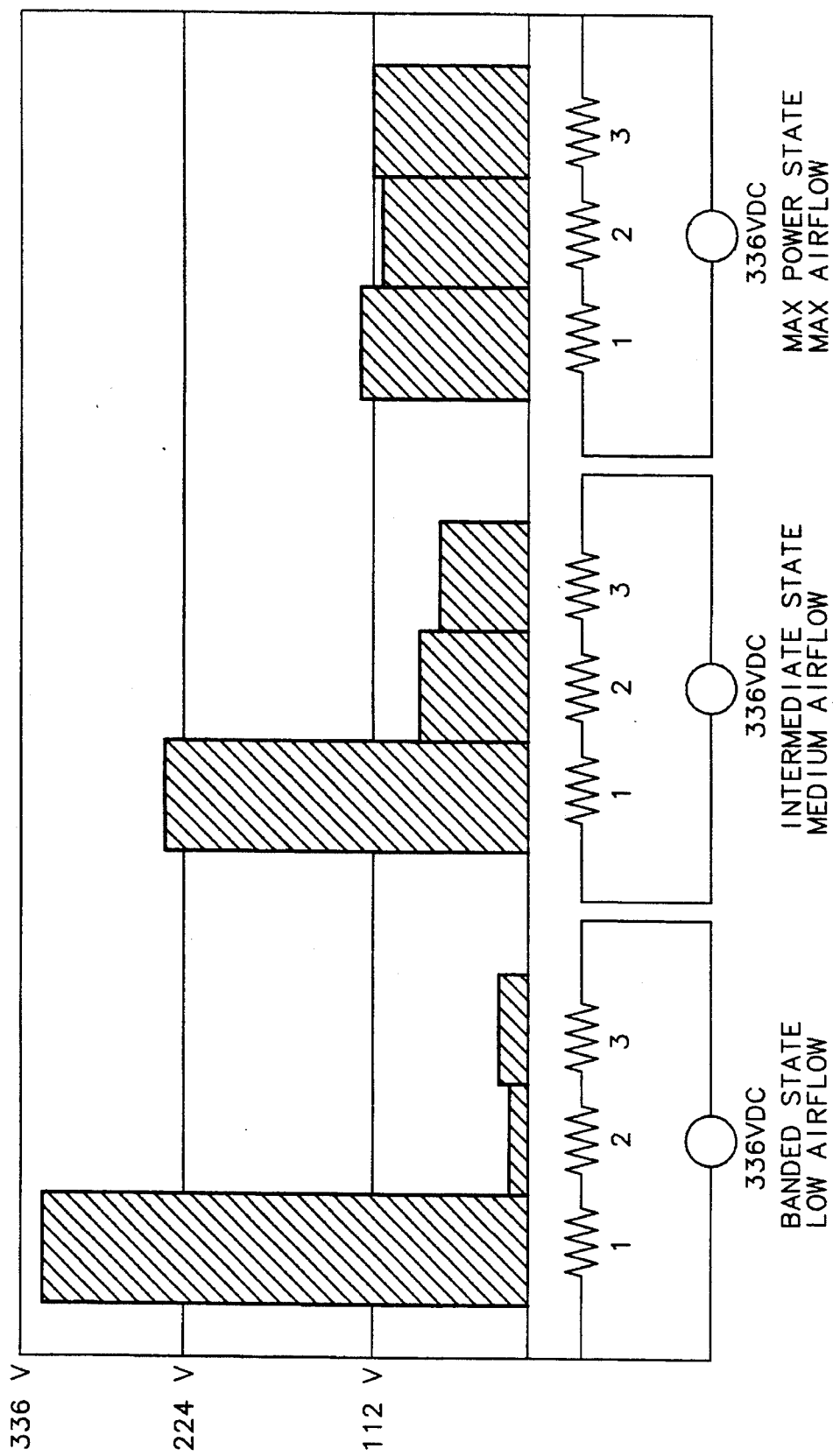
FIG. 8 is a bar chart showing voltage drops across each of three series-connected PTC heater elements in several different airflow rates.

FIG. 5 is a schematic diagram of a similar heater apparatus 102 in which a third PTC heater element is electrically connected in series relation. In both the FIGS. 4 and 5 embodiments, suitable compressive force, as indicated by arrows 125, is applied to each assembly to provide a good electrical and thermal connection among the several components, as in the FIG. 1–3 embodiment. Although single heater elements are shown serially connected in the FIGS. 4 and 5 embodiments, it will be appreciated that two or more PTC heater elements could be provided between each of the heat transfer members 120 as well. Heater apparatus for heating a fluid stream can be provided according to the invention utilizing a single group of serially connected PTC heater elements as shown in FIGS. 4 and 5 or a plurality of parallel connected groups wherein the heater elements within each group are serially connected.

It should be understood that although particular embodiments of the heater apparatus of the invention have been described by way of illustrating the invention, many modifications are possible within the scope of the invention and the invention includes all modifications and equivalents of the disclosed embodiments falling within the scope of the appended claims.

In view of the above, it will be seen that means of the invention costly control switching to turn off zones of heaters at low airflow in order to prevent overheating of ducts can be eliminated with the heater apparatus made in accordance with the invention generating maximum power at high flow but "banding" and automatically shut down one or more zones at low flow without expensive external switches. The invention also provides an automatic safety back-up, as noted above, in the event that one PTC heater element fails shorted the other series PTC heater elements will act as series automatic resetting fuses without causing a general system failure.

We claim:

1. Heater apparatus for heating a fluid passing through said heater at a selected flow rate comprising first and second elongated frame members, the frame members each formed with a recess aligned with and facing one another and forming a flow passage having an inlet and outlet, a plurality of pairs of electrically conductive heat transfer members having opposite distal end portions received in the respective recesses of the frame members, the heat transfer members each configured to define a plurality of fluid receiving passages communicating with the inlet and outlet of the flow passage, a plurality of standard self-regulating electrical resistance heater elements having opposed upper and lower electrically conductive surfaces, at least one heater element disposed between each pair of heat transfer members, with the upper and lower electrically conductive surfaces thereof in electrical engagement with respective heat transfer members of a pair and having thermally conductive grease placed between the heater elements and contiguous heat transfer members; and electrical terminals, connected to said heater elements, said heater elements electrically connected in series.

2. Heater apparatus according to claim 1 in which at least two heater elements are disposed between each pair of heat transfer members.

3. Heater apparatus according to claim 1 in which an electrically insulative gasket having a heater element window is placed around each heater element, the gasket preventing electrical shorting between adjacent heat transfer members around the heater elements.

4. Heater apparatus according to claim 1 further including a plurality of groups electrically connected in parallel with each other.

5. Heater apparatus according to claim 1 in which the electrical terminals each comprises a plate lying in a plane having a front and back edge portion, a plurality of notches are formed in the front and back edge portions and the outer edge portions are bent slightly out of the plane of the plate between adjacent notches alternately up and down in order to enhance rigidity of the apparatus.

6. Heater apparatus according to claim 1 further including a spring member mounted on the frame members and adapted to place a compressive force on the heat transfer members and heater elements to obtain a good electrical and thermal connection among the heat transfer members and the heater elements.

7. Heater apparatus according to claim 1 in which the first and second elongated frame members are formed of electrically insulative material.

8. A process for heating a fluid stream comprising the steps of taking a plurality of standard PTC self-regulating electrical resistance heater elements and a plurality of heat transfer members, each transfer member configured to form a plurality of fluid receiving passages, placing each electrical heater element in heat conductive relationship with at least one heat transfer member and having thermally conductive grease placed between the heater elements and at least one heat transfer member, arranging the heater elements to form at least one group, each group containing at least two heater elements, electrically connecting the heater elements within each group in series, and flowing said fluid stream through said plurality of heat transfer members at a selected rate of flow.

9. A process according to claim 8 including the step of providing a plurality of groups of heater elements and electrically connecting the groups in parallel.

10. Heater apparatus comprising a housing defining a fluid passage therethrough, heat transfer means mounted in the passage of the housing, a plurality of standard self-regulating electrical resistance heater elements each in heat transfer relation with the heat transfer means and having conductive grease placed between the heater elements and the heat transfer means, electric circuit elements for connecting the heater elements to an electric source, at least two of the heater elements electrically connected in series so that when fluid flow rates through the passage are above a selected rate which varies with the temperature of the fluid, the voltage drop across each of the at least two heater elements is generally equal with the resistance of each element being relatively low, and as fluid flow through the passage decreases below the selected rate the resistance of one of the series connected heater elements increases until most of the voltage potential of the electric source is dropped across the said one of the series heater elements thereby effectively shutting off the other of the said series connected heater elements and reducing the heat output of the heater apparatus.

11. Heater apparatus according to claim 10 in which there are three heater elements electrically connected in series.

12. Heater apparatus according to claim 10 in which the heater elements are arranged in groups, the heater elements within each group being electrically connected in series and the groups being electrically connected in parallel.

13. Heater apparatus according to claim 12 in which there are three heater elements connected in series in each group.

* * * * *